United States Patent [19]

Schaedler et al.

[11] Patent Number: 5,517,811
[45] Date of Patent: May 21, 1996

[54] PIVOTING GRASS CHUTE

[75] Inventors: Axel Schaedler, North Royalton; Michael Miller, Brunswick, both of Ohio

[73] Assignee: MTD Products Inc., Cleveland, Ohio

[21] Appl. No.: 424,209

[22] Filed: Apr. 19, 1995

[51] Int. Cl.⁶ .................................................. A01D 34/70
[52] U.S. Cl. .............................. 56/320.2; 56/202
[58] Field of Search .................. 56/16.6, 320.2, 56/202

[56] References Cited

U.S. PATENT DOCUMENTS 3,928,956  12/1975  Boyer ............................ 56/202
4,203,276  5/1980  Plamper .......................... 56/202

FOREIGN PATENT DOCUMENTS 2247152  5/1975  France ........................... 56/202
2223043  11/1972  Germany ........................ 56/202

Primary Examiner—David J. Bagnell
Attorney, Agent, or Firm—Lightbody & Lucas

[57] ABSTRACT

A grass discharge member for a lawn mower discharge chute automatically converted to/from a grass bag use or a direct discharge use positions upon the mounting/dismounting of the grass bag.

23 Claims, 3 Drawing Sheets

PIVOTING GRASS CHUTE

FIELD OF THE INVENTION

This invention relates to an improved grass discharge member and, more particularly in the preferred embodiment, a pivoting discharge member selectably moveable between a direct discharge and grass bag use positions.

BACKGROUND OF THE INVENTION

Lawn mowers having grass chutes have been utilized in consumer and professional applications for many many years. The ubiquitous rotary mower is a familiar sight on urban and suburban landscapes. Typically this type of rotary mower, whether it be single or multiple bladed, has a discharge chute for transferring the grass clippings from underneath the rotary mower deck, which clippings may be dispersed over the lawn (as in the case of the direct discharge lawn mower), or which may be collected in a collection means such as a grass bag for later processing. Some lawn mowers are convertible, typically having some sort of cover member which is movably mounted to the lawn mower, so as to allow for the selective connection/disconnection of a grass bag from an otherwise blocked discharge chute. Typically, however, these conversion means are inconvenient to use and/or require additional steps in order to accomplish a successful interconnection of the grass bag to the lawn mower. This is often inconvenient and difficult for the typical consumer to manage.

OBJECTS AND SUMMARY OF INVENTION

It is an object of the present invention to increase the ease of conversion of lawn mowers from dispersal to a collection mode.

It is yet another object of the invention to improve the efficiency of lawn mowers with grass bags.

It is yet another object of the present invention to simplify the process of converting a lawn mower from direct discharge to collection mode.

It is still another object of the present invention to increase the serviceability of lawn mowers.

Other objects in a more complete understanding of the invention may be had by referring to the following description and drawings in which:

BRIEF DESCRIPTION OF THE DRAWINGS

The structure, operation, and design of the invention will become apparent on consideration of the following description of the preferred embodiment of the invention taken in conjunction with the accompanying drawings wherein.

DETAILED DESCRIPTION OF THE INVENTION

This invention relates to an improved lawn mower.

The invention will be described in a preferred embodiment of a single bladed riding lawn mower having a rear mounted grass bag. This lawn mower includes a mower frame 10 (shown in representational form in FIG. 5) supported by wheels (not shown) for controlled travel over the ground. The particular mower frame 10 disclosed is that of a rear engine riding lawn mower having a mower deck 11 suspended underneath for accomplishing the actual mowing function. Other types of mowers including push mowers can utilize the invention. The invention can also be utilized with other discharge locations including side discharge.

Figure 5:
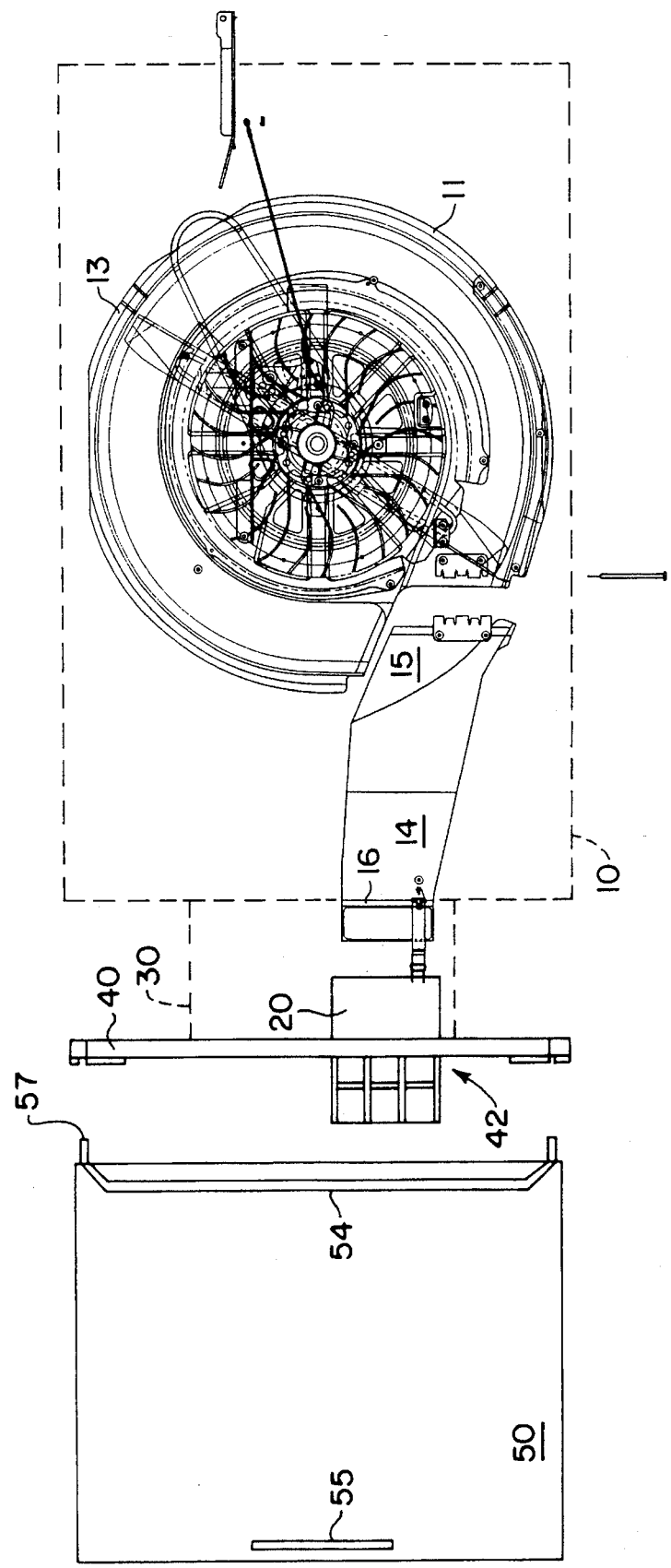
FIG. 5 is a downward partially separated representational view of the lawn mower of FIG. 1.

The particular mowing deck 11 disclosed is a 30-inch single bladed deck 13 (FIG. 5). The rear discharge chute 14 is pivotally connected at its front 15 to the mower deck and at its rear portion 16 to the mower frame 10 so as to allow the mower deck 11 to be selectively moved upwards and downwards to order to control the height of cut and/or to avoid scalping the lawn.

Invention of this particular application relates to a discharge member 20. This discharge member 20 is located axially off of the end 16 of the rear discharge chute 14.

This discharge member 20 is movable between two positions. In a first position (FIG. 4) the discharge member 20 cooperates with the discharge chute 14 so as to deflect grass clippings and/or residue upwards and backwards into the associated grass bag 50. In a second position (FIG. 2) the discharge member 20 cooperates with the discharge chute 14 in order to deflect grass clippings downward into the lawn for eventual disintegration. The discharge member is biased into the second position.

As the discharge member 20 disclosed is utilized in a rear discharge lawn mower, it is mounted in the back section of the mower frame 10.

The mounting for the preferred rotating discharge member 20 includes mounting brackets 30 and an air dispersal member 40.

The mounting brackets 30 are adapted to interconnect the air dispersal member 40 fixedly to the mower frame 10. As the mower is a rear discharge mower, the mounting brackets 30 are fixedly bolted to the aft section of the mower frame 10 so as to extend axially off of such frame.

The mounting brackets 30 allow for room for the moving discharge member 20 and the rear discharge chute 14, while at the same time fixedly interconnecting the air dispersal member 40 to the frame 10.

The air dispersal member 40 serves as an intermediate member between the mower frame 10 and the grass bag 50, serving primarily to cooperate with the latter in grass collection.

The particular air dispersal 40 member disclosed is a flat sheet of stamped steel 41 which has a clearance opening 42 and a multitude of air openings 43.

The air dispersal member 40 is mounted off of the back of the mower frame 10 by the mounting brackets 30 with the clearance opening 42 generally in line with the discharge chute 14 of the mower deck 11. The discharge member 20 itself is located in the clearance opening 42 pivotally or rotatively mounted to the air dispersal member 40 for movement between the first position—directing the clippings upward and backward and a second position—directing the clippings downward (contrast FIG. 4 with FIG. 2). The discharge member 20 is biased in the second position such that upon removal or non-existence of the grass bag 50, the discharge member 20 is located to direct the grass clippings downward onto the lawn instead of through the clearance opening 42 in the air dispersal member. The preferred form of biasing is a spring 27. Alternately weights or an off center pivot point could be utilized. Typically in each position, it is preferred that the deflection surface 27 of the discharge member 20 is in contact (or close proximity with) the discharge chute 14 (top of bottom edge respectively). This provides for efficient transfer or directing of the clippings.

A hanger bar 45 is located across the top of the air dispersal member. This hanger bar 45, together with the alignment hooks 46 thereon, are for mounting of the grass bag 50 onto the air dispersal member 40 (and thus the mower frame 10).

The grass bag 50 itself has a generally rectangular frame 51 surrounded by a porous material 52 on all but one side. This side is the open front 53. A front handle 54, a rear handle 55 and two reinforcing bars 56 complete the assembly.

Figure 1:
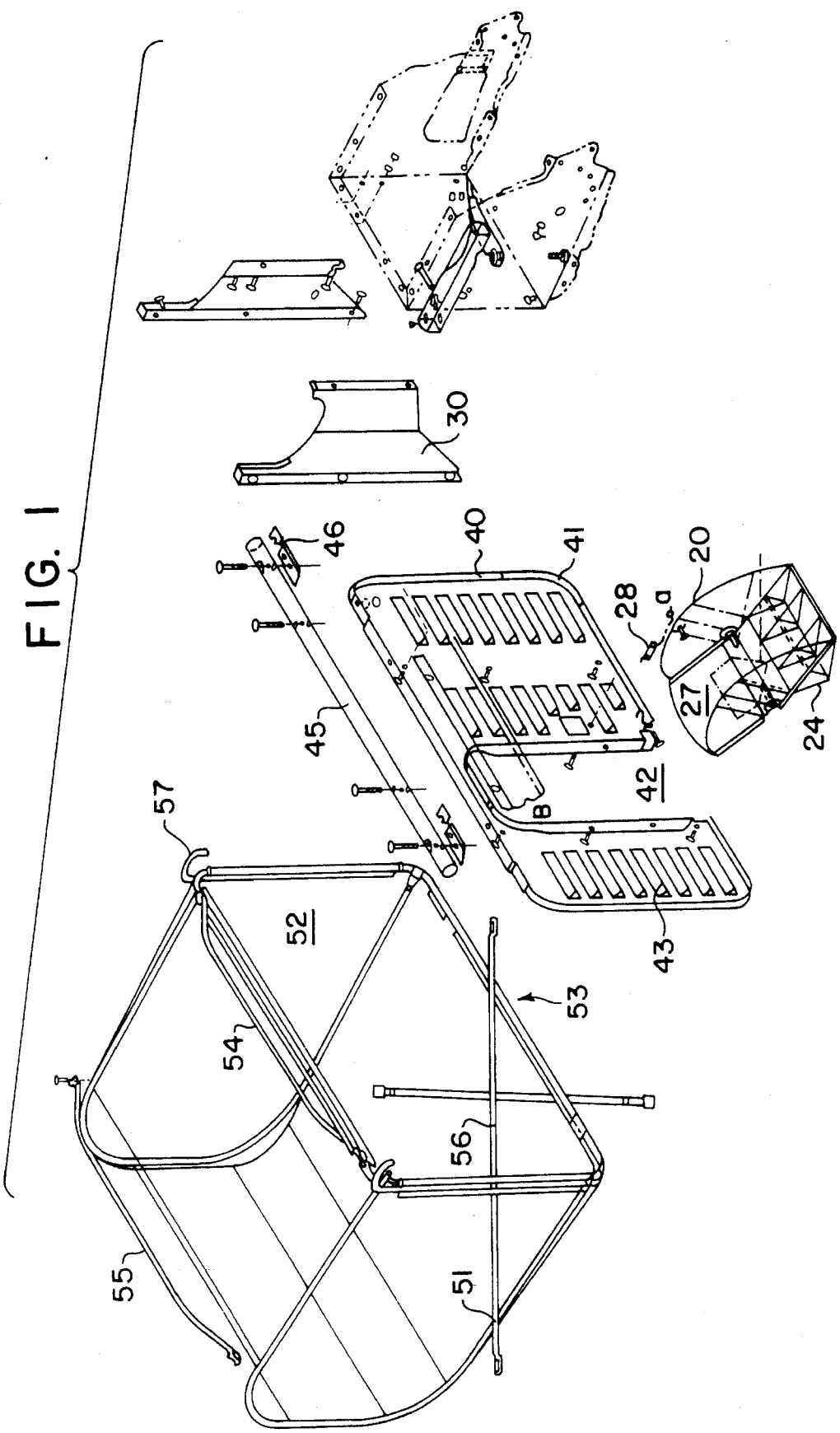
FIG. 1 is a respective view of the back section of a rear discharge riding lawn mower incorporating the present invention.
Figure 2:
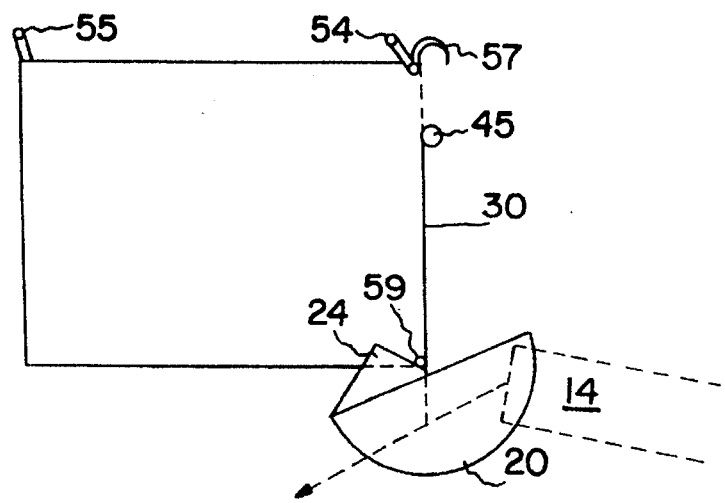
FIGS. 2–4 are a series of cutaway side views of the rear discharge area of the lawn mower FIG. 1 detailing the conversion of the lawn mower to grass collection mode.

In use, two mounting brackets 57 locating extending off of the top front edge of the frame 51 hook over the hanger bar 45 at the alignment hooks 46 so as to selectively interconnect the grass bag 50 to the air dispersal member 40. The act of lowering these mounting brackets 57 of the grass bag 50 onto the hanger bar 45 has the effect of causing the bottom front edge 59 of the grass bag to contact the then exposed activation section 24 of the discharge member 20 (FIG. 2). Due to the angular orientation of this activation section 24 in respect to the dispersal member 30 the edge 59 of the grass bag 50 is temporarily affixed in a position to activate the discharge member 20.

Figure 3:
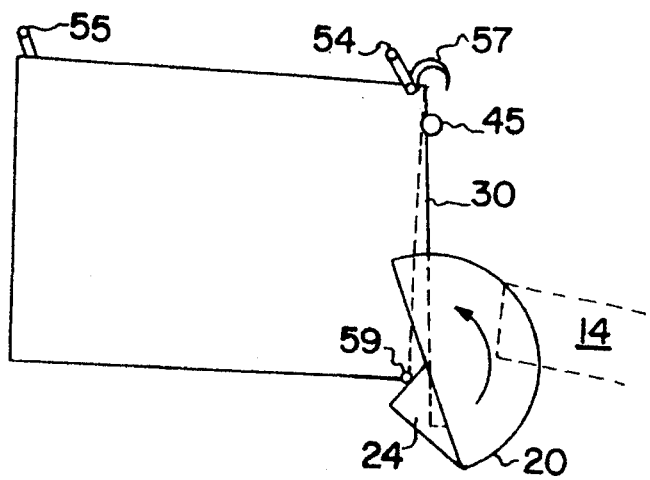
Figure 4:
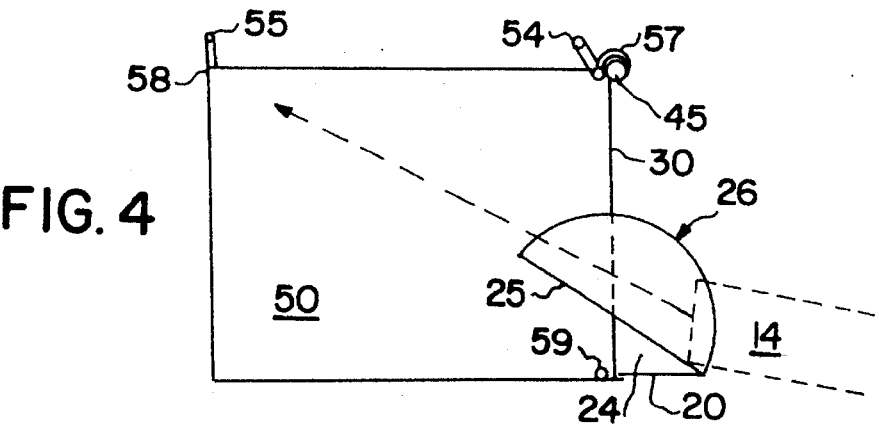

Further physical connecting movement causes further movement of the grass bag 50 downwards to rotate the discharge member 20 between its second position directing the grass clippings downwards to a first position directing clippings upwards and backwards through the clearance opening 42 and thus into the grass bag 50 (FIGS. 3 and 4). Note that as the front edge 59 moves downward the lever arm effect in respect to the activation section 24 increases, thus lowering the amount of force necessary to move and then retain the discharge member 20 in its second position. As shown in FIG. 3 on early positioning the spring 27 might bias the grass bag 50 outwards absent operator counterforce.

Due to the fact that in the first position the trailing surface 25 of the discharge member 20 is generally directed to the back top end edge 58 of the grass bag 50, virtually the entire grass bag 50 can be filled with clippings before significant back pressure occurs. In this unlikely event, the open top 26 of the discharge member 20 would allow grass clippings to escape into the area between the air dispersal member 40 and the mower frame 10, thus allowing continued operation of the lawn mower itself.

In addition to the above, the air openings 43 in the air dispersal member 40 are oversized, each being some half inch deep by four inches long. This allows for efficient air movement from the grass bag 50 to the surrounding atmosphere irrespective of the condition of the porous material 52 of such grass bag. Further, the cooperation of the discharge member 20 and air dispersal member 40 also provides that there is minimal residual leakage of grass clippings out of these openings 43.

Although the invention has been described in the preferred mode to a certain degree of particularity, it is to be understood that numerous changes can be made without deviating from the claims as hereinafter set forth.

We claim:

1. In a lawn mower having a discharge chute with an end and a connected grass bag, the improvement comprising a discharge member, said discharge member having a deflection surface, pivoting means to pivotally connect said discharge member to the end of the discharge chute with a first position with said deflection surface directing clippings outward and a second position with said deflection surface directing clippings downward, biasing means to bias said discharge member in said position, and alteration means for the connection of the grass bag to change over said discharge member to said first position.

2. The invention of claim 1 characterized by the addition of a spring and said biasing means including said spring.

3. The invention of claim 1 wherein the grass bag is mounted to a hanger bar and has an in use position and said alteration means includes the connection of the grass bag the to said hanger bar to the grass bags in use connected position.

4. The invention of claim 1 characterized in that said pivoting means allows substantially 270° rotation of said discharge member.

5. The invention of claim 1 wherein the connected grass bag has an upper corner and characterized in that in said first position of said discharge member, said deflection surface directs the clippings toward said upper corner of said connected grass bag.

6. The invention of claim 1 characterized in that the connected grass bag has a bottom front edge and characterized in that said alteration means includes said bottom front edge.

7. The invention of claim 6 characterized by the addition of said discharge member including an activation section and said alteration means including said bottom front edge of the grass bag contacting said activation section.

8. The invention of claim 1 characterized in that said discharge chute is a generally tubular member having an end with a top edge, and said deflection surface contacting said top edge of the discharge chute in said second position.

9. The invention of claim 1 characterized in that said discharge chute is a tubular member having an end with a bottom edge and characterized in that said deflection surface is in contact with said bottom edge of the discharge tube in said first position.

10. The invention of claim 1 characterized in that the grass bag is connected to the lawn mower with a substantially downward motion and said alteration means including said downward motion of the grass bag.

11. The invention of claim 1 characterized in that said discharge member has an open top in said first position, and said open top being located between the end of the discharge chute and the grass bag.

12. In a lawn mower having a discharge chute with an end and a connected grass bag, the improvement comprising a discharge member, pivoting means to pivotally connect said discharge member to the end of the discharge chute with a first position directing clippings outward and a second position directing clippings downward, biasing means to bias said discharge member in said second position, and alteration means for the connection of the grass bag to change over said discharge member to said first position, an air dispersal member and said pivoting means including said air dispersal member.

13. In a lawn mower having a frame, a rear discharge chute with an end and a grass bag, the improvement comprising an air dispersal member, means to fixedly connect said air dispersal member to the frame of the lawn mower adjacent to the discharge chute, a discharge member, pivoting means to mount said discharge member to said air dispersal member off of the end of the discharge chute, said discharge member being movable between a first position directing clippings outward and a second position directing clippings downward, spring means to bias said discharge member in said second position, pivot means to connect the grass bag to said dispersal member, the grass bag having a use position in respect to said air dispersal member; and alteration means for the connection of the grass bag to said use position to change over said discharge member to said first position.

14. The invention of claim 13 characterized in that said discharge member has an open top in said first position, and said open top being located between the end of the discharge chute and said air dispersal member.

15. In a lawn mower having a mower deck with a discharge chute extending for a spaced distance outwardly from such mower deck, the discharge chute having an end, and a connected grass bag, the improvement comprising a discharge member, pivoting means to pivotally connect said discharge member to the end of the outwardly extending discharge chute with a first position directing clippings outward and a second position directing clippings downward, biasing means to bias said discharge member in said second position, and alteration means for the connection of the grass bag to change over said discharge member to said first position.

16. The invention of claim 15 characterized in that said discharge member includes a single deflection surface.

17. The invention of claim 16 wherein the connected grass bag has an upper corner and characterized in that in said first position of said discharge member, said deflection surface directs the clippings toward said upper corner of said connected grass bag.

18. The invention of claim 15 characterized in that the connected grass bag has a bottom front edge and characterized in that said alteration means includes said bottom front edge.

19. The invention of claim 18 characterized by the addition of said discharge member including an activation section and said alteration means including said bottom front edge of the grass bag contacting said activation section.

20. The invention of claim 19 characterized in that said discharge chute is a generally tubular member having an end with a top edge, and said deflection surface contacting said top edge of the discharge chute in said second position.

21. The invention of claim 15 characterized in that said discharge chute is a tubular member having an end with a bottom edge and characterized in that said deflection surface is in contact with said bottom edge of the discharge tube in said first position.

22. The invention of claim 15 characterized in that the grass bag is connected to the lawn mower with a substantially downward motion and said alteration means including said downward motion of the grass bag.

23. The invention of claim 15 characterized in that said discharge member has an open top in said first position, and said open top being located between the end of the discharge chute and the grass bag.

\* \* \* \* \*